US006823294B1

(12) United States Patent
Guthrie

(10) Patent No.: US 6,823,294 B1
(45) Date of Patent: Nov. 23, 2004

(54) METHOD AND SYSTEM FOR MEASURING CIRCUIT DESIGN CAPABILITY

(75) Inventor: William E. Guthrie, Santa Clara, CA (US)

(73) Assignee: Collett International, Inc., Santa Clara, CA (US)

( * ) Notice: Subject to any disclaimer, the term of this patent is extended or adjusted under 35 U.S.C. 154(b) by 0 days.

(21) Appl. No.: 09/357,084

(22) Filed: Jul. 20, 1999

(51) Int. Cl.⁷ .......................... G06F 17/50; G06F 19/00
(52) U.S. Cl. ............................... 703/2; 703/6; 703/20; 700/95; 700/182; 702/182
(58) Field of Search .......................... 703/20, 22, 2, 703/6; 700/97, 98, 182, 109, 95; 702/84, 182; 716/4, 6, 8, 9, 10

(56) References Cited

U.S. PATENT DOCUMENTS

| | | | |
|---|---|---|---|
| 5,655,074 A | * 8/1997 | Rauscher | 395/183.14 |
| 5,655,110 A | * 8/1997 | Krivokapic et al. | 395/500 |
| 5,691,909 A | * 11/1997 | Frey et al. | 364/474.01 |
| 5,822,218 A | * 10/1998 | Moosa et al. | 364/488 |
| 5,867,400 A | * 2/1999 | El-Ghoroury et al. | 364/490 |
| 5,910,897 A | * 6/1999 | Dangelo et al. | 364/488 |
| 5,920,484 A | * 7/1999 | Nguyen et al. | 364/489 |
| 6,269,277 B1 | * 7/2001 | Hershenson et al. | 700/97 |
| 6,289,255 B1 | * 9/2001 | Shah et al. | 700/97 |
| 6,564,176 B2 | * 5/2003 | Kadtke et al. | 702/189 |

OTHER PUBLICATIONS

Vincent Shen, "A Little Quality Time," IEEE Software, Sep. 1987, pp. 84–85.

Peter Clarke, "EDA Vendors, Users Debate Best Route to Improved Design Productivity as Chip Complexity Mounts—Panel Weighs Productivity Impact of Methods, Tools," URL=http://www.techweb.com/se. EETimes Issue 1014, Jun. 29, 1998, 2 pages.

Peter Clarke, "DAC Debates Evolutionary/Revolutionary EDA Platform Shift—Funding Cuts Said to Stall Net's Role in Design," URL=http://www.techweb.com/se, EETimes Issue 1013, Jun. 22, 1998, 2 pages.

Craig Matsumoto, "EDAC Seeks to Quantify Time–to–Market Gains," URL=http://www.techweb.com/se, EETimes TechWeb News, Jun. 16, 1997, 2 pages.

(List continued on next page.)

Primary Examiner—Thai Phan
(74) Attorney, Agent, or Firm—Dergosits & Noah, LLP; Richard A. Nebb

(57) ABSTRACT

A method is provided for quantifying circuit design complexity. Conclusions regarding the time and effort to implement a circuit design are thereby derived and historical and predictive analyses prepared. Common circuit design parameters are determined using a computer-implemented Normalization Method. In the Normalization Method, the effort required to implement circuitry is quantified by evaluating each one of a set of complexity factors. The total transistor count of a circuit is then adjusted according to these complexity factors to produce a "normalized transistor" count. Design characteristics or factors that influence complexity are identified from among raw data in a database of integrated circuit design project data. These factors are then incorporated into a Normalization Equation such that normalized transistor count is a statistically significant predictor of required design project effort. An identified design characteristic is expressed mathematically as either a composition term or a figure of merit term. A scaling process is used to derive a complexity factor reflecting different levels of relative design complexity within each composition term and the relative magnitude of impact for figure of merit terms. An empirical approach or estimation is used to determine levels of complexity and magnitudes of impact. A report can also be generated to estimate the amounts of time, effort, and personnel required to accomplish a proposed circuit design project.

25 Claims, 4 Drawing Sheets

OTHER PUBLICATIONS

V. Coté et al., "Software Metrics: An Overview of Recent Results," Journal of Software 8, 1988, pp. 121–127.

Thomas J. McCabe, "A Complexity Measure", IEEE Transactions on Software Engineering, vol. SE–2, No. 4, Dec. 1976, pp. 308–320.

Geoffrey K. Grill et al., "Cyclomatic Complexity Density and Software Maintenance Productivity," IEEE Transactions on Software Engineering vol. 17, No. 12, Dec. 1991, pp. 1284–1288.

Maurice H. Halstead, "Element of Software Science," Elsevier Science Library, Operating and Programming Systems Series, pp. 46–61, 110–115.

Charles A. Behrens, "Measuring the Productivity of Computer Systems Development Activities with Function Points," IEEE Transactions on Software Engineering, vol. SE–9, No. 6, Nov. 1983, pp. 648–652.

T.C. Jones, "Measuring Programming Quality and Productivity," IBM Systems Journal, vol. 17, No. 1, 1978, pp. 39–43.

Marco Iansiti et al., "Technology Integration: Turning Great Research into Great Products," Harvard Business Review, May–Jun. 1997, pp. 69–79.

Thomas J. Allen, "Studies of the Problem–Solving Process in Engineering Design," IEEE Transactions on Engineering Management, vol. EM–13, No. 2, Jun. 1996, pp. 72–83.

Tom DeMarco, "Software Productivity: The Covert Agenda," Software Producitivty, Apr. 1990, vol. 32, No. 3, pp. 225–227.

Charles R. Symons, Function Point Analysis: Difficulties and Improvements, IEEE Transactions on Software Engineering, vol. 14, No. 1, Jan. 1988, pp. 2–11.

Jeffrey S. Poulin, "Metrics for Object–Oriented Reuse," Lockheed Martin Federal Systems, URL=http//www.owego.com/–poulinj/Papers, 4 pages.

Competitive Semiconductor Manufacturing Program, "The Competitive Semiconductor Manufacturing Survey: First Report on Results of the Main Phase," Engineering Systems Research Center, U.C. Berkeley, Report CSM–02, Apr. 1993, pp. 1–97.

David P. Angel, "Restructuring for Innovation: The Remaking of the U.S. Semiconductor Industry," The Guilford Press, 1990, pp. 193–203.

* cited by examiner

FIG. 4-A

*NORMALIZATION EQUATION*

$$X_{nom} = X_{total} \times f_1(\text{circuit type}) \times f_2(\text{reuse}) \times f_3(\text{frequency}) \times f_4(\text{density})$$

*CIRCUIT TYPE* — 412

Coefficient value — 410

$f_1(\text{circuit type}) = \quad (t_{CL} \times \% \text{ control logic}) +$  $\quad t_{CL} \quad 1.00$ — 450
$(t_{MEM} \times \% \text{ memory}) +$ $\quad t_{MEM} \quad 0.14$ — 452
$(t_{AMS} \times \% \text{ analog \& mixed signal}) +$ $\quad t_{AMS} \quad 5.32$ — 454
$(t_{DP} \times \% \text{ datapath})$ $\quad t_{DP} \quad 1.28$ — 456

| Transistors by Circuit Type | Number | Percent | |
|---|---|---|---|
| Control Logic — 420 | 287,349 — 424 | 24% | — 442 |
| Memory — 422 | 820,911 — 426 | 69% | — 444 |
| Analog Mixed Signal — 423 | 15,906 — 428 | 1% | — 446 |
| Datapath — 425 | 69,250 — 430 | 6% | — 448 |
| TOTAL | 1,193,416 — 432 | 100% | |
| $F_1$ Circuit Type Multiplier | | 0.48 | |

*REUSE* — 414

$f_2(\text{reuse}) = \quad (1.0 \times \% \text{ new circuitry}) +$ Coefficient value
$(r_L \times \% \text{ reused logical capacity}) +$ $\quad r_L \quad 0.31$ — 476
$(t_P \times \% \text{ reused physical capacity})$ $\quad r_P \quad 0.71$ — 478

| Transistors (Circuitry) Reuse | |
|---|---|
| Logical transistors — 470 | 1.6% |
| Physical transistors — 472 | 88.9% |
| New transistors — 474 | 7.2% |
| $F_2$ frequency multiplier | 0.71 |

*FREQUENCY* — 416

$f_3(\text{frequency}) = f_3 [\text{frequency}(F) \times \text{gate delay}(D)]$  *Std FxD value*

$f_3(\text{frequency}) = e^{(0.23 \times \frac{FxD - \overline{FxD}}{\sigma_{FxD}})}$  mean 17,402 — 482
std deviation 18,382 — 484

Normalized Transistors Calculation

| F*D this design — 486 | 13,294 |
|---|---|
| Std residual | −0.22 |
| $F_3$ frequency multiplier — 488 | 0.95 |

FIG. 4-B

__DENSITY__

$f_4(density) = f_4(density \times pitch^2/layers)$
$Z = density \times pitch^2/layers$ $f_4(density) = e^{(0.23 \times \frac{Z-\bar{Z}}{\sigma_Z})}$ __Std pitch²/layer value__
mean          22,074 ~494
std deviation  16,818 ~496

Normalized Transistors Calculation

| density x pitch²/layers this design ~492 | 2294 |
|---|---|
| Std residual | -1.18 |
| F₃ desity multiplier ~498 | 0.76 |

__NORMALIZED TRANSISTOR COUNT      294,307 ~497__

METHOD AND SYSTEM FOR MEASURING CIRCUIT DESIGN CAPABILITY

BACKGROUND OF THE INVENTION

1. Field of the Invention

The present invention relates to circuit design productivity management. More specifically, the present invention relates to a method and system for measuring the output of integrated circuit design projects to permit the measurement and comparison of design team performance.

2. Description of Related Art

Integrated circuits are becoming increasingly complex to design, and the difficulty of completing circuit design projects on time is rising as a consequence. Rapid delivery of newly designed products to the market is one of the most competitive factors in the electronics industry. It can therefore be of critical importance to circuit designers and manufacturers to determine the effort that is required to design a target circuit. Such a determination can promote the efficient allocation of personnel and resources, and can permit the identification of inefficiencies within the design process. However, it is extremely difficult to assess the complexity of a target circuit and accordingly the amount of effort required to design it.

A circuit is a term that is used to describe a collection of electronic components that perform a particular function. An integrated circuit is a circuit manufactured on a single semiconductor substrate comprising transistors, resistors, capacitors, and other circuit elements. Conventional CMOS integrated circuits generally comprise extremely large numbers of transistors and rarely contain other types of circuit elements.

In a typical integrated circuit design project, a logic design is created and then translated into sets of geometric patterns which are used to fabricate the physical integrated circuit device. The effort required in each stage of circuit design and implementation can vary due to such factors as the number of transistors and types of circuits in the design. Because circuits can have widely varying functions and numbers of transistors, it has not been possible to easily determine if an integrated circuit has been efficiently developed.

In the prior art, attempts have been made to determine metrics and units of measurement for the outcome of integrated circuit development projects. An example of such an attempt is a study by Marco Iansiti, published in Harvard Business School Press "Technology Integration", 1998, p. 57, that cites transistor density (transistors per square millimeter) as the central measurement of project performance. All other differences in product complexity were addressed by comparing design projects within certain categories such as DRAM or microprocessor. Project efficiency was then evaluated by directly comparing time and effort consumed in the development process, after adjusting for transistor density.

Researchers have attempted to define complexity measures for computer software programs. For example, in "Elements of Software Science," 1977 New York: Elsevier, M. H. Halstead uses the length of a program in lines of code to define its complexity. T. J. McCabe characterizes a program's complexity by measuring the number of control paths it contains, as explained in "A Complexity Measure," IEEE Transactions on Software Engineering, vol. SE-2, December, 1976. Such measures of complexity are used today to improve software quality and to manage software engineering productivity.

Density and transistor count have been recognized as being important factors in assessing circuit design productivity. However, additional circuit design factors such as circuit type and design reuse have not been taken into account in the prior art.

It would therefore be an advantage to provide a method for comparing different circuit designs based on their complexity and for measuring complexity in a consistent way. It would be a further advantage if such method were available to permit both historical and predictive analyses of circuit design projects.

SUMMARY OF THE INVENTION

The present invention provides a method and system for measuring circuit design complexity. The intrinsic complexity of an integrated circuit design can be measured and expressed as a single numeric value that can be used to represent the results produced by a design team. Historical and predictive analyses of circuit design projects can thereby be provided.

The present invention can be used to derive conclusions regarding the time and effort required to implement a target circuit design. These conclusions can then be used to allocate personnel or funding to the target circuit design project, implement procedural changes to improve design efficiency, or to prepare a bid for the project. A report can also be generated to estimate the amounts of time, effort, and personnel required to accomplish a proposed circuit design project.

The preferred embodiment of the present invention comprises five components. The Normalization Method is used to enable the comparison of heterogeneous designs and the calculation of certain Design Capability Metrics. The Design Capability Metrics are used to enable management decision-making. The design data and performance measurements are stored in the Design Project Database. This data can then be used to produce a Project Performance Assessment and/or a Best Practice Analysis. Software tools can also be used to streamline and standardize data collection.

In the Normalization Method according to the present invention, a normalized transistor count is determined by adjusting the actual transistor count based upon the composition of the design, or the degree to which certain types of circuits are present or absent from the design, as well as based upon the values of certain attributes which are common to all designs. Two types of complexity factors are identified and used to adjust transistor count—circuit composition factors, and attribute figure of merit factors.

A Design Project Database ("database") of integrated circuit design project data provides the raw data from which the appropriate complexity factors are identified. Tests of significance can be applied to this data using standard statistical analysis to identify factors that significantly impact project effort. These factors are then incorporated into a Normalization Equation in such a way that normalized transistor count is a statistically significant predictor of required design project effort.

The Normalization Equation comprises a series of multiplicative terms, each of which represents either a circuit composition factor or an attribute figure of merit factor. Terms that represent circuit composition factors are expressed mathematically as the sum of fractional portions of the design, each with a weighting coefficient that reflects the relative difficulty of implementing the portion. Terms that represent attribute figure of merit factors are expressed mathematically as an exponential. The exponent is the standard residual of the figure of merit factor multiplied by a coefficient that reflects the maximum impact the term can have on normalized transistors. The Normalization Equation can be modified over time as the complexity of integrated circuit design changes, for example, by adding and deleting terms.

Coefficients required in the terms of the Normalization Equation are derived from empirical data captured in the database. Two methods may be used to calculate the coefficients. In the first method, effort is compared among projects in which only the factor under study varies and all other factors remain constant. Variation in effort is associated with variations in the value of the factor. From this relationship, the coefficients may be determined.

In the second method, a large sample of design project data is required, but coefficients may be accurately determined from full-project data. A series of steps involving multiple regression analysis and factor analysis is used to isolate the effects of individual complexity factors on project effort.

BRIEF DESCRIPTION OF THE DRAWINGS

FIG. 4 is a flow chart showing an exemplary Normalization Equation calculation according to the present invention.

DETAILED DESCRIPTION OF THE INVENTION

Figure 1:
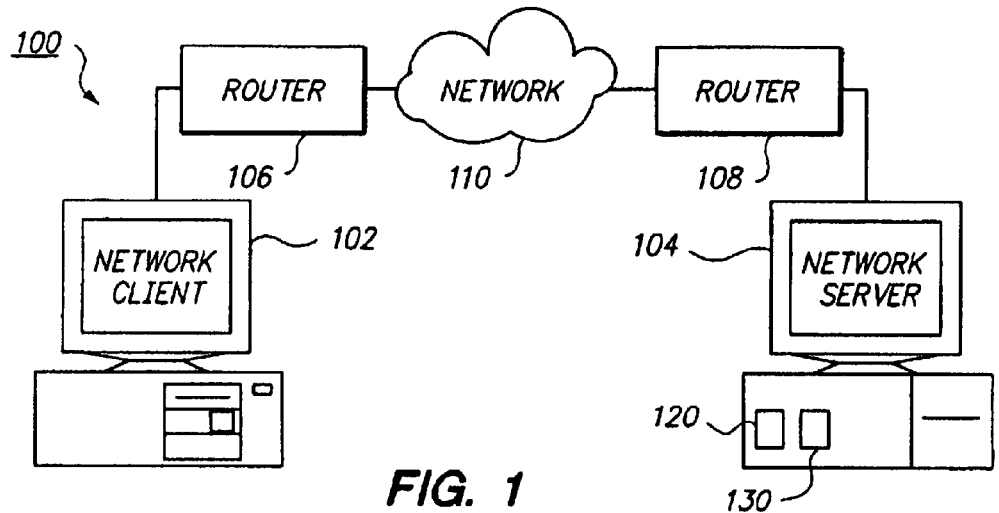
FIG. 1 is a block diagram of a computer network system according to one embodiment of the present invention.

The present invention provides a computer-implemented method and system for measuring circuit design complexity and for determining resulting circuit design capability. The method can be used with any suitable computer, processor-based device, or computer network.

The present invention recognizes that a method that permits comparison of different circuit designs can be used to advantage to derive conclusions regarding additional circuit designs. The intrinsic complexity of an integrated circuit design is measured and this complexity is expressed as a single numeric value that can be used to represent the results produced by a design team. Conclusions can thereby be derived regarding the time and effort required to implement a target circuit design. For example, the present invention permits the comparison of two similar project teams by normalizing differences in the complexity of their respective circuit designs using the Normalization Method, described in further detail below.

The present invention can be used to provide both historical and predictive analyses of circuit design projects. The specific, measurable determinants of circuit design complexity that affect project effort are isolated from other factors, such as design methods. A quantitative definition of circuit design complexity that represents the aggregate impact of these determinants is then established. These conclusions are then used to, for example, allocate personnel or funding to a target circuit design project, implement procedural changes to improve design efficiency, or to prepare a bid for the project. A report can also be generated to estimate the amounts of time, effort, and personnel required to accomplish a proposed circuit design project.

In the present invention, transistor count is "normalized" in accordance with the relative magnitude of various complexity factors which are present in a given circuit design, thereby facilitating a comparison of designs of differing complexities. The term "normalize" is used in the sense of making the transistor count conform or reduce to a norm or standard. For purposes of this application, "to normalize" means to transform the count of transistors in a circuit design to a standard counting system in which each transistor requires the same amount of implementation effort. The process of adjusting actual transistor count is called the "Normalization Method," and the results of the normalization method computations are referred to herein as "normalized transistors."

The normalized transistor count is determined by adjusting the actual transistor count based upon the composition of the design, or the degree to which certain types of circuits are present or absent from the design, as well as based upon the values of certain attributes which are common to all designs. Attribute values are combined in various ways to create figures of merit which reflect attribute interactions and compensating effects on design complexity. Thus, two types of complexity factors are identified and used to adjust transistor count—circuit composition factors, and attribute figure of merit factors.

Furthermore, the present invention permits the calculation of the amount of normalized transistors produced per unit of project effort. This measure is referred to herein as design productivity. Design productivity is considered to be a primary design capability metric for the purposes of this application. For example, if one team uses highly automated design methods and another team uses labor-intensive manual methods, the invention provides conclusions regarding the impact of design methods on design productivity. Because the Normalization Method excludes design methods from its calculations, it is possible to use the results to isolate the effects of design methods and draw specific conclusions about ways to improve design capability.

A database of historical integrated circuit design project data is accumulated to provide the raw data from which the appropriate complexity factors are identified. Each project record in the database contains the total project effort as well as any associated complexity factors. Such historical project data can include but is not limited to information regarding staffing levels, timetables, schedules, milestones, circuit type, percentage of reused transistors, clock frequency, and circuit density. One or more tests of significance can be applied to this data using standard statistical analysis to determine if project effort is explained by a given complexity factor.

Those factors identified among the raw data that significantly impact project effort are incorporated into the Normalization Equation. The present invention provides a method for combining these factors in a Normalization Equation in such a way that normalized transistor count is a statistically significant predictor of required design project effort.

The Normalization Equation comprises a series of multiplicative terms, each of which represents either a circuit composition factor or an attribute figure of merit factor. The equation can be modified over time as the complexity of integrated circuit design changes, for example, by adding and deleting terms. Thus, the Normalization Method will be useful for many years and will be applicable even as the nature of integrated circuit design changes.

Terms that represent circuit composition factors are expressed mathematically as the sum of fractional portions of the design, each with a weighting coefficient that reflects the relative difficulty of implementing the portion.

Terms that represent attribute figure of merit factors are expressed mathematically as an exponential. The exponent is the standard residual of the figure of merit factor multiplied by a coefficient that reflects the maximum impact the term can have on normalized transistors.

Coefficients required in the normalization terms are derived from empirical data captured in the design project database. Two methods may be used to calculate the coefficients. In the first method, effort is compared among projects in which only the factor under study varies and all other factors remain constant. Variation in effort is associated with variations in the value of the factor. From this relationship, the coefficients may be determined. This method is difficult to apply by analyzing entire design projects, since many factors vary at once. However, it is practical to apply this method to isolated partitions of designs, which may be very similar from project-to-project. This approach works well with small samples, since there are few variables that reduce the degrees of freedom in the analysis.

In the second method, a large sample of design project data is required, but coefficients may be accurately determined from full-project data. A series of steps involving multiple regression analysis and factor analysis is used to isolate the effects of individual complexity factors on project effort.

The preferred embodiment of the present invention comprises five components. The Normalization Method is used to enable the comparison of heterogeneous designs and the calculation of certain Design Capability Metrics. The Design Capability Metrics are used to enable management decision-making. The design data and performance measurements are stored in the Design Project Database. This data can then be used to produce a Project Performance Assessment and/or a Best Practice Analysis. Software tools can be used to streamline and standardize data collection.

In the following description, for purposes of explanation, numerous specific details are set forth in order to provide a thorough understanding of the present invention. It will be evident, however, to one skilled in the art that the present invention may be practiced without the specific details. In other instances, well-known structures and devices are shown in block diagram form to facilitate explanation. The description of preferred embodiments is not intended to limit the scope of the claims appended hereto.

Any or all of the software applications or hardware configurations of the present invention can be implemented by one skilled in the art using well known programming techniques and hardware components. In one embodiment, the present invention is implemented using a computer. Such computer can include but is not limited to a personal computer, network computer, network server computer, dumb terminal, local area network, wide area network, personal digital assistant, Internet-capable electronic device, work station, minicomputer, and mainframe computer. The identification, search and/or comparison features of the present invention can be implemented as one or more software applications, software modules, firmware such as a programmable ROM or EEPROM, hardware such as an application-specific integrated circuit ("ASIC"), or any combination of the above.

FIG. 1 is a block diagram of a computer network system 100 according to one embodiment of the present invention. In computer network system 100, a network server computer 104 is connected to a network client computer 102 through a network 110. The network interface between server computer 104 and client computer 102 can also include one or more routers, such as routers 106 and 108. The routers serve to buffer and route the data transmitted between the server and client computers.

Network 110 may be the Internet, a Wide Area Network (WAN), a Local Area Network (LAN), or any combination thereof. In one embodiment of the present invention, the server computer 104 is a World-Wide Web (WWW) server that stores data in the form of 'Web pages' and transmits these pages as Hypertext Markup Language (HTML) files over the Internet network 110 to client computer 102. It should be noted that, although only one server and client computer each are illustrated in network system 100, a network that implements embodiments of the present invention may include a large number of interconnected client and server computers. For purposes of this application, the computer(s) and/or network system according to the present invention will be collectively referred to as the "computer". The use of the term "computer" is in no way intended to limit the scope of the present invention as claimed herein. As has been described above, the computer can include any suitable and well-known hardware and software components, and in any well-known configuration to enable the implementation of the present invention.

In the preferred embodiment of the present invention, one or more databases are used to store information for use in the measure of circuit design capability. As used herein, the term "database" 130 refers to a collection of information stored on one or more storage devices accessible to the computer. In FIG. 1, the database is stored on the network server. However, in alternative embodiments of the present invention, the database can be stored on any other device(s) that is accessible to the computer or computer network. The use of the term database is in no way intended to limit the scope of the present invention as claimed herein.

The database according to the present invention can include one or more separate, interrelated, distributed, and relational databases. The database can include, for example, integrated circuit design project information, clock frequency and gate speed data, circuit design data, data regarding design characteristics that influence IC design complexity, and data regarding the actual effort required to complete each design project.

The present invention is also implemented using well-known programming techniques and one or more software applications that are accessible to the computer network system. For purposes of this application, these software applications will be called the "program" 120. The use of the term program is in no way intended to limit the scope of the present invention as claimed herein.

In FIG. 1, the program is stored on the network server. However, in alternative embodiments of the present invention, the program can be stored on any other device(s) that is accessible to the computer or computer network. For example, in a networked embodiment, components of the program can be stored on either or both of the network server and network client. In an embodiment which does not use a network, the program components can reside on any device accessible to the computer.

The program, as described herein, comprises one or more software applications that are used to implement the method for measuring circuit design capability. For example, the program can include but is not limited to a database application for creating and addressing the database, a statistical analysis software application for analyzing the database to derive estimated and/or empirical values, a software application for deriving the normalization results according to the present invention, and a software application for generating reports and conclusions based upon the normalization results.

The program can include any combination of interrelated applications, separate applications, software modules, plug-in components, and intelligent agents. The software applications that comprise the program can be stored on any storage device accessible to the computer, including but not limited to a hard drive, CD-ROM, DVD, magnetic tape, optical drive, programmable memory device, and Flash RAM. It will be readily apparent to one of skill in the art that the software applications of the program can be stored on the same or different storage devices.

The present invention can use any well-known software applications, residing on any suitable computer system to store, retrieve, and manipulate this data. An example of a suitable database software application is Microsoft Visual Foxpro. The database according to the present invention can be stored on any appropriate storage device, including but not limited to a hard disk drive, CD-ROM, DVD, magnetic tape, optical drive, removable cartridge, programmable memory device, and Flash RAM.

The development of an integrated circuit ("IC") requires a certain amount of work, or effort. The present invention uses project effort as a measure of outcome to detect chip complexity in the empirical data. Thus, in the invention, the program is used to analyze the relationship between chip complexity factors, such as circuit type, and the amount of project effort required to implement the chip design. If a correlation is found between a complexity factor and effort, then this complexity factor is incorporated into the Normalization Equation according to the relative impact of the factor.

Figure 2:
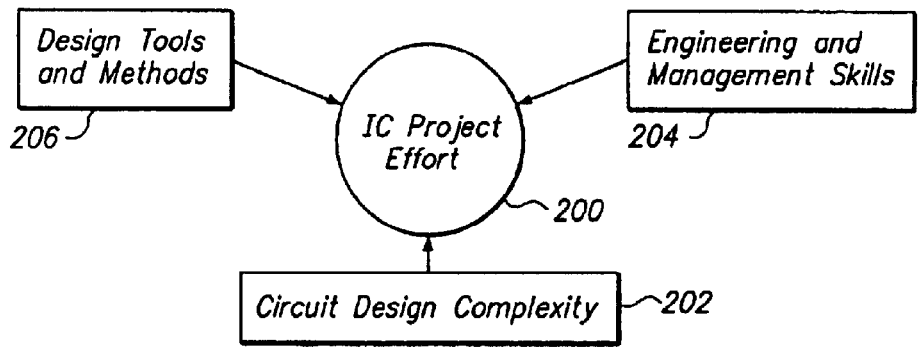
FIG. 2 is an overview diagram of factors that influence integrated circuit design project effort.

FIG. 2 is an overview diagram of factors that influence integrated circuit design project effort 200. One such factor is the complexity of the circuit design 202. According to the preferred embodiment of the invention, effort is the primary factor that is measured to determine circuit design complexity. In this preferred embodiment, effort is considered to be a measurement of total manpower required to develop the IC that is being designed. For example, this includes but is not limited to, effort from product marketing, architectural design, logic design, physical layout, mask design, and manufacturing and test engineering personnel. In mathematical terms, effort is expressed as the integral of the number of people working on the project at a given time versus the total time required to complete the project.

In alternative embodiments of the invention, development time can be used as a factor that is measured to determine circuit design complexity. However, development time is, in part, the result of management priority and decision making rather than being exclusively a direct result of circuit design complexity. This is because the amount of time required to complete a specific integrated circuit development project is also determined by the number of people available to work on the project. The required effort can be delivered over a shorter time frame if the project is staffed heavily, or over a longer time frame if fewer people are assigned.

In addition to circuit design complexity, such other factors affecting the amount of effort required by a specific circuit development project can include the level of engineering and management skill of the development project team 204 and the quality and availability of the design automation tools and methods used by the team 206. The program uses the Normalization Equation according to the present invention to offset the influence of chip complexity in order to detect the impact of other factors that influence the integrated circuit design project effort.

In the present invention, one or more software applications comprising the program are used to calculate circuit design complexity. The resulting complexity calculations are then used by the program in the performance of additional calculations that describe design capability.

To calculate circuit design complexity for a target project according to the invention, a standardized method of complexity measurement is first established. This standardized method is referred to herein for purposes of describing the present invention as the Normalization Method.

In the presently preferred embodiment of the invention, the total number of transistors in a circuit design is the parameter that has been selected as the basis for measurement of circuit design complexity. Accordingly, a basic concept underlying the Normalization Method is that all integrated circuit designs comprise transistors that can be counted and used as a quantitative basis for measuring complexity. While the total number of transistors in the circuit design has been selected as the basis for measurement of complexity in the preferred embodiment of the present invention, the teachings of the invention can also be applied to other terms of measurement, including but not limited to logic gates, standard cells, layout elements such as source, gate and drain terminals, and interconnect segments.

In the Normalization Method according to the preferred embodiment, this transistor count is adjusted to accurately reflect the design complexities of the respective ICs. The adjusted transistor count is referred to herein for purposes of describing the present invention as Normalized Transistors. An increase in the number of Normalized Transistors in an IC design results in a proportional increase in project effort required to implement the IC design.

Figure 3:
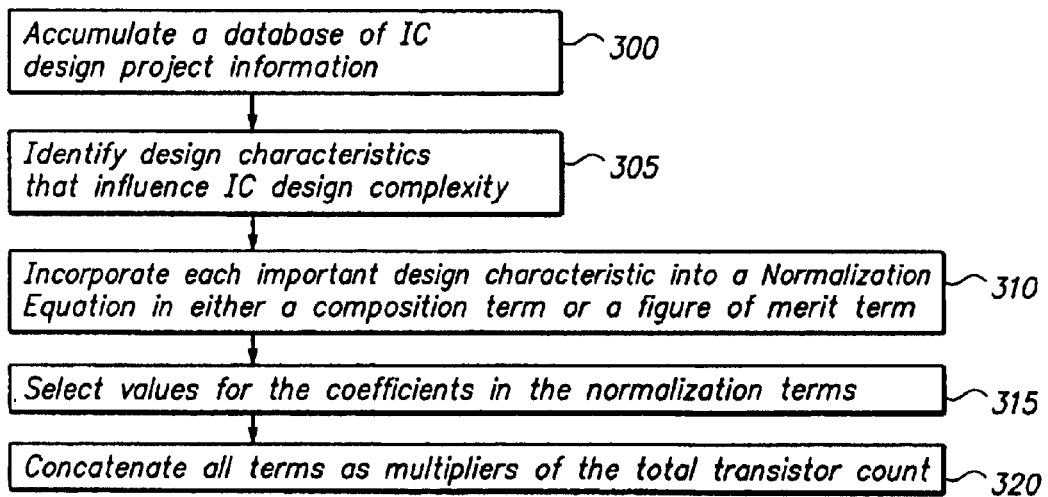
FIG. 3 is a flow chart for establishing the Normalization Method according to the present invention.

FIG. 3 is a flow chart for establishing the Normalization Method according to the present invention. The first step (300) in the normalization Method is accumulating a database of integrated circuit design project information. This computer-accessible database can be stored in one or more appropriate storage devices, including but not limited to a hard disk drive, CDROM, magnetic tape, and removable cartridge.

The information that is stored in the database can include, for example, data regarding factors that describe circuit design complexity plus the actual effort required to complete each project. In the presently preferred embodiment of the invention, the information stored in the database is collected from participating design companies and departments. This data can be normalized and analyzed to discern design trends and to compare design performances. The data is preferably maintained in such a way that participants' design capabilities can be compared, but individual companies cannot be identified.

One suitable software application for collecting the information from the participating companies and departments is Microsoft Excel. In the preferred embodiment of the invention, an Excel workbook is customized to the program. This customized application can then be distributed to participants for their use in inputting the requested information. This information can then be sent to the database by any appropriate automatic or manual means, including but not limited to as an e-mail attachment, being directly saved to the database, and using the World Wide Web.

The design characteristics that influence IC design complexity are identified (305) from among the raw data in the database. These design characteristics are preferably selected by those of skill in the art of integrated circuit design. In the presently preferred embodiment, data that meets the selected design characteristics criteria is identified from among the data in the computer-accessible database using well-known computer software and hardware components.

Tests of significance can then be applied to this identified data, for example, using standard statistical analysis. These tests of significance are preferably applied using statistical analysis software applications, including but not limited to SPSS and SAS for factor analysis, and Microsoft Excel's built-in Analysis ToolPak for running regression analysis and other functions. In the preferred embodiment of the present invention, factor analysis is used to identify appropriate complexity factors, with project effort also being used as a dependent variable. Design characteristics that can be evaluated in the measurement of circuit design complexity according to the present invention include but are not limited to those listed in Table 1, below.

TABLE 1

DESIGN COMPLEXITY CHARACTERISTIC

Number of Transistors
Number of Circuit Blocks
Percentage of Transistors Used for Control Logic Circuitry
Percentage of Transistors Used for Data Path Circuitry
Percentage of Transistors Used for Memory Circuitry
Percentage of Transistors Used for Analog and Mixed-Signal Circuitry
Percentage of Reused Circuitry in Logical Format
Percentage of Reused Circuitry in Layout Format
Percentage of Reused Specifications
Percentage of Reused Simulation Models
Average Clock Frequency of Unique Blocks of Circuitry in the Design
Gate Delay under Nominal Conditions
Silicon Layout Density
Minimum Feature Size
Number of Metal Routing Layers
Number of Power Modes
Number of Asynchronous Clock Boundaries
Number of Control Bits
Minimum and Maximum Operating Voltages
Number of Signal Pins on the Package
Maximum Clock Skew
Use in Battery Powered Applications The next step (310) in establishing the Normalization Method is to incorporate each important design characteristic into a Normalization Equation. The Normalization Equation according to the present invention has the general form:

$$Xn = Xt * F1 * F2 * F3 * \ldots Fn \quad (1)$$

where, $Xn$=number of normalized transistors $Xt$=total number of transistors in the design $F1$=first design characteristic term $Fn$=nth design characteristic term The number of terms in the Normalization Equation is determined by the number of design characteristics stored in the database that are identified as having a significant impact on project effort. The program incorporates each such characteristic in one of two types of terms, composition terms or figure of merit terms. In many cases, more than one design characteristic is combined as a single term in the Normalization Equation.

The Normalization Equation is generalized and may be extended to include any number of complexity factors. The program adjusts the Normalization Equation to reflect these additional or differing groups of complexity factors by multiplying the total number of transistors by these factors. The Normalization Equation may also be modified over time as design practices change and technology advances.

The program derives a composition term by grouping design characteristics that have a common trait, such as a type of circuitry. For example, it is possible to divide a circuit design's transistors into mutually exclusive portions that exhibit different levels of design complexity, and therefore require different amounts of effort to implement. Taken together, the portions describe the composition of the circuit design with respect to the common trait (type of circuitry).

The total number of transistors can be determined by any suitable method of counting or by estimation. For example, Cadence Design System's Dracula can be used to count the total number of transistors in the completed circuit design layout. In the preferred embodiment of the present invention, the program counts the total number of transistors in the circuit design. The program designates a variable to represent this total number of transistors. In this embodiment, the program uses automated design software to count transistors according to data stored in a circuit design database.

The program expresses composition term components as a percentage of the total number of transistors in the design. Composition terms have the form:

$$F = \%A * a + \%B * b + \ldots \%N * n \quad (2)$$

Where, $F$=a composition term in the Normalization Equation

%A=percentage of total transistors having trait "A"

%N=percentage of total transistors having trait "N"

a=1 b=ratio of effort to implement circuitry of trait "B" to effort to implement circuitry of trait "A"

n=ratio of effort to implement circuitry of trait "N" to effort to implement circuitry of trait "A"

An important property of a composition term is that component portions always sum to unity, such that all transistors in the design are accounted for.

$$1 = \%A + \%B + \ldots \%N \quad (3)$$

In the above example of design complexity, the program adjusts the number of transistors represented by each component of the composition term upwards or downwards as a function of the relative effort required to implement the particular portion of the design.

The following examples illustrate transistor count adjustment according to the present invention.

EXAMPLE 1

In Example 1, a circuit design is composed of 50% digital logic and 50% analog circuitry. The analog circuitry of this example requires five times the effort to design as the digital logic requires. Therefore, the program counts analog transistors in a 5:1 ratio relative to the digital logic transistors. In this example, the composition term in the Normalization Equation is:

(50% Digital Logic*1+50% Analog*5)=3

EXAMPLE 2

In Example 2, the IC design is composed of 50% digital logic and 50% memory cell transistors. In this example, it is assumed that, on a per transistor basis, memory requires only $\frac{1}{20}$ of the effort to design and implement as does control logic. The composition term in the Normalization Equation for this example is:

(50% Digital Logic*1+50% Memory*0.05)=0.525

As illustrated in Examples 1 and 2, at least one component of a composition term must be treated as a reference component. Typically, the coefficient of this reference component is set to unity (1) and the program determines the values of the coefficients of other composition term components by an analysis of data from the database of integrated circuit project information. Therefore, the combination of component portions of a design determines the value of composition terms used in the respective Normalization Equation.

The program combines design characteristics that affect complexity, using a different method when a specific characteristic is not adequately represented by a summation of component portions of the total circuit design. An example of such design characteristic is transistor density. Transistor density is a complexity factor that describes a characteristic of the overall design. It is a continuous variable and therefore is not easily classified into discrete groups for use in comparing different projects. Furthermore, transistor density is affected by other factors such as semiconductor processing requirements and limitations, for example, the number of metal routing layers available. Therefore, it can be difficult to compare transistor density values without considering these other factors.

In the present invention, the program combines compensating complexity factors to form a figure of merit that can be compared directly to the corresponding figure of merit of another circuit design. According to the present invention, the program uses a figure of merit to adjust transistor count upwards or downwards based on the complexity introduced by the level, degree, or amount of one or more attributes of the design.

In the preferred embodiment of the present invention, the program is used to compare a figure of merit for the target circuit design to the average and standard deviation for all corresponding figures of merit derived from projects in the historical integrated circuit project information database. The results of this comparison are incorporated in the Normalization Equation as part of an exponential term.

Figure of merit terms of the Normalization Equation according to the present invention have the form:

$$F = \exp(a * \text{standard residual of the figure of merit}) \quad (4)$$

where,
a=scaling coefficient
(The standard residual of the figure of merit is an equation that is described below in further detail.)
According to the preferred embodiment of the invention, there are three stages in the derivation of a figure of merit term by the program. The first stage is the elimination of any effects the absolute value of a figure of merit might have when used as a multiplicative term in the Normalization Equation. The program accomplishes this by calculating the standard residual of the figure of merit.

A standard residual for a variable is defined as the difference between the value of a data point and the mean of the distribution divided by the standard deviation of the mean. Thus, for a normally distributed figure of merit, 99.8% of all designs' figures of merit will have standard residual values between +3 and −3. This approach has the normalizing effect of transforming any measured value, regardless of the system of units used in the measurement, into a value lying in the range of −3 to +3. It has the further practical merit in that this can be accomplished using standard statistical techniques, and well-known software and hardware components.

The second stage is ensuring that the term is "well-behaved" for samples at the limits of the distribution. The program accomplishes this by using an exponential form that dampens the effects of low values of a figure of merit and accelerates the effects of high values. As physical limits are reached, an exponentially increasing amount of effort is required to increase the figure of merit further. Conversely, as complexity drops and the figure of merit decreases, further reduction in project effort diminishes as other factors begin to dominate. The program uses an exponential form to incorporate the standard residual as the exponent. This form has the property that when the standard residual is zero, that is, the sample value equals the average of the distribution, then the value of the expression is 1.0. This characteristic addresses the need to have some reference for comparing complexity among design projects. In the preferred embodiment of the invention, the reference is the average value of the figure of merit for all projects in the integrated circuit design project database.

The third stage in deriving a figure of merit term is to scale the impact that complexity factors included in the term have upon the required integrated circuit design project effort. To accomplish this goal, the program is used to multiply coefficient "a" [see Eq. 4, above] by the standard residual of the exponent. For example, if a=0.23, then the value for the figure of merit term for a project having a figure of merit 3 standard deviations above the mean is 2.0. Conversely, a project with a low figure of merit, say 3 standard deviations below the mean, has a figure of merit term value of 0.5.

With reference to FIG. 3, after the program has identified all complexity factors that have a statistically significant correlation to project effort, the program incorporates these complexity factors in the Normalization Equation in either a composition term or a figure of merit term, as discussed with respect to Step (310).

Values are then selected for the coefficients in the normalization terms (315). One approach involves surveying a large number of people experienced in the art of integrated circuit design to obtain estimates of the impact various complexity factors have on project effort required.

The preferred embodiment of the present invention uses an empirical approach to analyze actual design project data. In this empirical approach, the program uses multiple regression analysis used to isolate the impact of each parameter on required effort. One skilled in the art will readily recognize that alternative techniques may also be used by the program to analyze the design project data.

Effort is defined for the purposes of this application as the amount of worker-hours required to complete a particular task. In the preferred empirical approach, the program is used to analyze differences in the effort required to design blocks of transistors that vary principally by one term. The impact of the different terms is therefore isolated and used to calculate coefficients for each design characteristic.

For example, a design can include collections of transistors (i.e. sub-circuits) that are reused from prior projects as well as transistors that are created anew for the design project. Generally, substantial engineering effort has already been expended to design the pre-existing reused circuits and therefore little engineering effort is required to re-use these pre-existing circuits in a new design project. By contrast, much more design effort is required to implement the new circuits. Therefore, design characteristic for the percentage of new design in comparison to old design is characterized as a composition term.

In this example, the unadjusted sum of reused and new transistors equals the total number of transistors. Expressed as percentages, this sum equals one (1). The program is used to assign weighting coefficients to the new transistors and the reused transistors in the design to reflect the differences in effort required to apply the new transistors in the design in comparison to the reused transistors. Because complexity is a comparative measure, the ratio of the weighting coefficients is significant. For example, a value of one (1) can be assigned to the coefficient for new transistors, and a value of less than one to reused transistors. The value of the complexity factor is therefore:

$$f_{(reuse)} = (1) \times (\%_{new}) + (a) \times (\%_{reused}) \quad (5)$$

where $f_{(reuse)}$ is the complexity factor for New/Reused transistors;

1 is the value of the coefficient for new transistors;

$\%_{new}$ is the percentage of new transistors;

a is the value of the coefficient that shows the relative amount of effort required for reuse in comparison to new circuit design.

$\%_{reused}$ is the percentage of reused transistors.

With reference to FIG. 3, the final step (320) in constructing the Normalization Equation is to concatenate all terms as multipliers of the total transistor count. Example 3 illustrates an exemplary Normalization Equation calculation according to the preferred embodiment of the present invention. The equations given in this example are valid for all similarly constructed circuit designs. However, the specific values provided in Example 3, for example, for the number of transistors the percentage of reused transistors, and the coefficients derived therefrom are specific to this example. Therefore, these results will vary according to the target circuit and data set being evaluated.

EXAMPLE 3

FIG. 4 is a flow chart showing an exemplary Normalization Equation calculation according to the present invention. In the Example, the Normalization Equation 410 used to derive the number of normalized transistors is expressed as a function of the evaluated complexity factors. The complexity factors identified for this exemplary integrated circuit design are the composition variables Circuit Type 412 and Reuse 414, and the figure of merit variables Frequency 416, and Density 418. The Normalization Equation according to Example 3 is:

$$X_{NORM} = X_{TOTAL} \times f_{1(Circuit\ Type)} \times f_{2(Reuse)} \times f_{3(Frequency)} \times f_{4(Density)}$$

where $X_{NORM}$ is the number of normalized transistors;

$X_{TOTAL}$ is the total number of transistors;

$f_{1(Circuit\ Type)}$ is the complexity factor for circuit type;

$f_{2(Reuse)}$ is the complexity factor for transistor reuse;

$f_{3(Frequency)}$ is the complexity factor for clock frequency; and $f_{4(Density)}$ is the complexity factor for circuit density.

In Example 3, the program uses industry average effort to calculate relative complexity factors or coefficients. The net effect of all of the different skills and methods applied during the design process can therefore be taken into account. However, in alternative embodiments, the program can use any appropriate measure of effort. For example, the average effort of different design teams within a specific corporation, or the average effort of design teams in a specific size company can be used.

The program determines the Circuit Type complexity factor 412 by first defining the categorization scheme of design characteristics for the circuit types in the exemplary integrated circuit design. In the Example, the design characteristics for the circuit type are Control Logic 420, Memory 422, Analog/Mixed-Signal 423, and Data Path 425. In Example 3, these design characteristics are determined empirically by collecting and analyzing circuit design data.

In Example 3, the program is used to determine the actual total number of transistors 432 in the design as well as to compute the numbers 424, 426, 428, 430 of each circuit type. The program is also used to determine the percentages 442, 444, 446, 448 of each type of transistor in comparison to the total number of transistors. The complexity factor for the circuit type is calculated using the formula:

$$f_{1(CircuitType)} = [(t_{CL}) \times (\%_{Control\ Logic})] + [(t_{MEM}) \times (\%_{Memory})] + [(t_{AMS}) \times (\%_{Analog-Mixed\ Signal})] + [(t_{DP}) \times (\%_{Data\ Path})]$$

where $f_{1(Circuit\ Type)}$ is the complexity factor for circuit type;

$t_{CL}$ 450 is the effort coefficient for control logic;

$t_{MEM}$ 452 is the effort coefficient for memory;

$t_{AMS}$ 454 is the effort coefficient for analog/mixed signal; and $t_{DP}$ 456 is the effort coefficient for datapath.

Each percentage of circuit type is multiplied by a coefficient representing the effort required to implement the respective type of transistor. This effort coefficient is a reflection of the number of circuit designers required to design the transistor, and the amount of time these circuit designers needed to complete the design. The values of the coefficients 450, 452, 454, 456 for each individual design characteristic are each represented as a ratio of the efforts required for the four selected design characteristics. The value of the complexity factor for circuit type is the sum of each percentage multiplied by its respective coefficient. In the example illustrated in Example 3, the circuit type complexity factor is 0.48.

The program is used to calculate the Reuse complexity factor 414 by first defining the relevant design characteristics for this factor. The design characteristics defined in this example are the percentages of reused Logical Transistors 470, reused Physical Transistors 472, and New Transistors 474. Logical Transistors are actual transistors that result from implementations of reused designs expressed in schematic, netlist, or Hardware Description Language formats. Physical Transistors are actual transistors that result from implementations of reused designs expressed in Grid Display System version 2 ("GDSII") or other layout formats such as Caltech Intermediate Format ("CIF").

These selected design characteristics reflect the fact that the amount of effort required to reuse a previously-designed circuit is in great part dependent upon the level of abstraction of the circuit design. For example, provided the transistors are similar in other characteristics, it typically requires more effort to implement a transistor that is logically described than a transistor that is physically described (i.e. for which there is mask-level data). This is because effort must be used to physically describe a re-used logical transistor, whereas a re-used physically-described transistor has already undergone this step. Generally, more memory circuits are reused in physical format and more control logic circuits are reused in logical format.

The program is used to determine the percentage of transistors in each category of transistor reuse and then to multiply each such percentage by a coefficient representing the effort required to implement the respective type of new or reused transistor circuitry. In Example 3, the coefficient for new transistors was selected to be one (1). The program computes a ratio of the efforts required to implement the two reused transistor design characteristics, thereby determining the coefficient value 476, 478 for each reused transistor design characteristic.

In Example 3, the value of $r_L$, the effort coefficient 476 for reused logical transistors, is less than the value of $r_P$, the effort coefficient 478 for reused physical transistors. This is a result of the empirical methods used in the example to calculate the coefficients. The effort coefficients 476, 478 also reflect the predominant design practice of reusing Memory circuits in Physical format and Control Logic circuits in Logical format (because there is greater benefit in effort reduction from reusing Control Logic in Logical format than there is in reusing Memory circuits in Physical format).

The complexity factor for the percentage of reused transistors is determined by the formula:

$$f_{2(Reuse)} = [(1) \times (\%_{New\ Circuitry})] + [(r_L) \times (\%_{Reused\ Logical\ Circuitry})] + [(r_P) \times (\%_{Reused\ Physical\ Circuitry})]$$

where $f_{2(Reuse)}$ is the complexity factor for transistor reuse;

1 is the effort coefficient for new circuitry;

$r_L$ is the effort coefficient for reused logical circuitry; and $r_P$ is the effort coefficient for reused physical circuitry.

In Example 3, the complexity factor for transistor reuse is computed to be 0.71.

The Clock Frequency complexity factor 416 is a figure of merit. In the Example, the program is used to determine this complexity factor by using the program to analyze clock frequency and gate speed data that is maintained in a database to determine empirical values. The program is then used to determine the mean value 482 and standard deviation 484 for the figure of merit.

In Example 3, a figure of merit term is derived according to the three stages previously discussed. The program is first used to calculate the standard residual of the figure of merit to eliminate any effects the absolute value of the figure of merit might have when used as a multiplicative term in the Normalization Equation.

The program then uses an exponential form to ensure that the term is "well-behaved" for samples at the limits of the distribution. Finally, the program is used to scale the impact that complexity factors included in the term have the required integrated circuit design project effort.

The complexity factor for the clock frequency is determined by the formula:

$$f_{3\ (Frequency)} = f_3[Frequency(F) \times Gate\ Delay(D)]$$

$$f_{3(Frequency)} = e^{\left(0.23 \times \frac{FxD - \overline{FxD}}{\sigma_{FxD}}\right)}$$

where $f_{3\ (Frequency)}$ is the complexity factor for clock frequency;

FxD is the value of the figure of merit calculated for the specific design being evaluated;

$\overline{FxD}$ is the mean figure of merit for the database; and $\sigma_{FxD}$ is the standard deviation of the distribution of data points.

In the Example, the exponential coefficient 0.23 is the value determined by the program to express the limits of the term's impact on normalized transistors. When the program uses the coefficient 0.23, a standardized +3σ figure of merit produces a term value of 2.0. This term means, for example, that for an extremely difficult circuit design, effort can be doubled. For an extremely easy circuit design, effort is halved. It is assumed, for the purposes of this Example, that a high figure of merit indicates a more difficult design challenge, or a more complex design, therefore requiring greater effort. Conversely, a low figure of merit is assumed to indicate a less difficult design challenge or a less complex design, requiring a lesser effort.

In Example 3, the program obtains a standard residual 488 of approximately −0.22 from dividing the standard deviation 484 into the difference between the value of the figure of merit 486 calculated for the specific design being evaluated and the mean figure of merit 482 for the database. The frequency complexity factor for this example is 0.95. (It is assumed, for the purposes of Example 3, that the average and the mean figure of merit values are equal.)

The density complexity factor 418 is also a figure of merit and can similarly be determined by estimation or empirical methods. Using the estimation method, the formula for calculating the density complexity factor is:

$$f_{4\ (Density)} = f_4(Density \times Pitch^2 / Layers)$$

Pitch is the measure of the sum of minimum metal trace width plus the space between metal traces for a given layer of the circuit. For purposes of this calculation pitch will be deemed to be the average pitch for the entire circuit.

Density is the total number of transistors in the circuit design divided by the total area of the semiconductor chip.

"Layers" are the total number of layers of metal interconnect used for signal routing in the circuit.

Z=(Density×Pitch²/Layers)

$$f_{4(Density)} = e^{\left(0.23 \times \frac{Z - \overline{Z}}{\sigma Z}\right)}$$

where $f_{4\ (Density)}$ is the complexity factor for density;

Z 492 is the figure of merit for the design being evaluated;

$\bar{Z}$ is the average figure of merit for the database; and $\sigma_Z$ is the standard deviation of the distribution of data points.

In Example 3, the program obtains a standard residual 498 of approximately −1.18 from dividing the standard deviation 496 into the difference between the value of the figure of merit 492 calculated for the specific design being evaluated and the mean figure of merit 494 for the database. The density complexity factor for this example is 0.76. The net effect of the four terms on actual transistor count is therefore:

$$Xn = Xt \times 0.48 \times 0.71 \times 0.95 \times 0.76 = Xt \times 0.246$$

where:

0.48=circuit type complexity factor
0.71=transistor reuse complexity factor
0.95=frequency complexity factor
0.76=density complexity factor In Example 3, therefore, the actual total number of transistors is 1,193,416 and the normalized transistor count 497 equals 294,307.

As has been discussed previously with respect to FIG. 3 and Example 2, relative complexity is compared by asserting that the average figure of merit for all design projects will produce a value of one (1) when factored into the Normalization Equation. In more complex designs having higher figures of merit, transistor count is increased and a term value greater than unity is produced. In the case for which the density figure of merit equals the average for the database, the formula is reduced to $e^0=1$. The normalized transistor count therefore remains the same as the actual transistor count.

Figure 5:
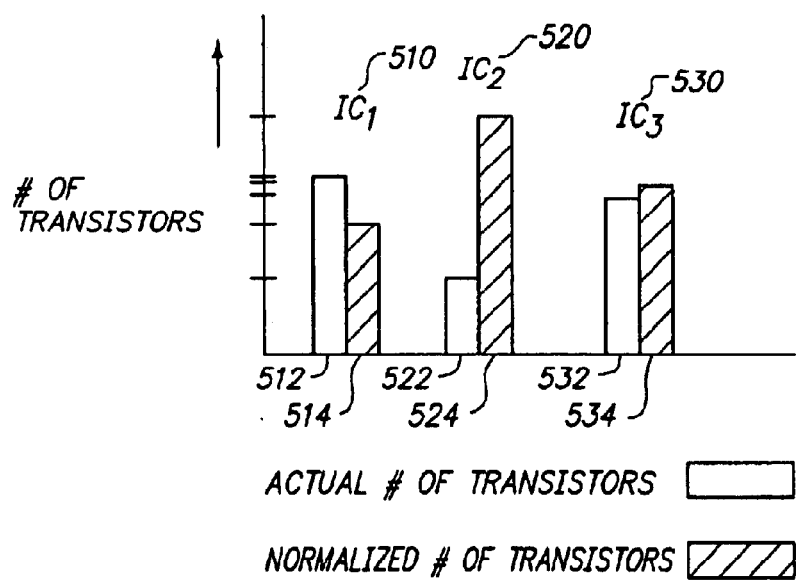
FIG. 5 is a bar graph showing normalization of integrated circuit transistor count according to the present invention.

FIG. 5 is a bar graph showing normalization of integrated circuit transistor count according to the present invention. In a first integrated circuit 510, the normalized number of transistors 514 is less than the actual number of transistors 512. In a second integrated circuit 520, the normalized number of transistors 524 is greater than the actual number of transistors 522. In a third integrated circuit 530, the normalized number of transistors 534 is slightly greater than the actual number of transistors 532.

Using the method according to the present invention, it now becomes possible to easily compare the amount of time and effort required to complete the design projects of the three integrated circuits. Thus, the present invention can be used to advantage to direct post design process activities. For example, financing, marketing, personnel, supply, and equipment decisions for such design projects can be accurately made using the results of the computer-implemented normalization method according to the present invention.

Figure 6:
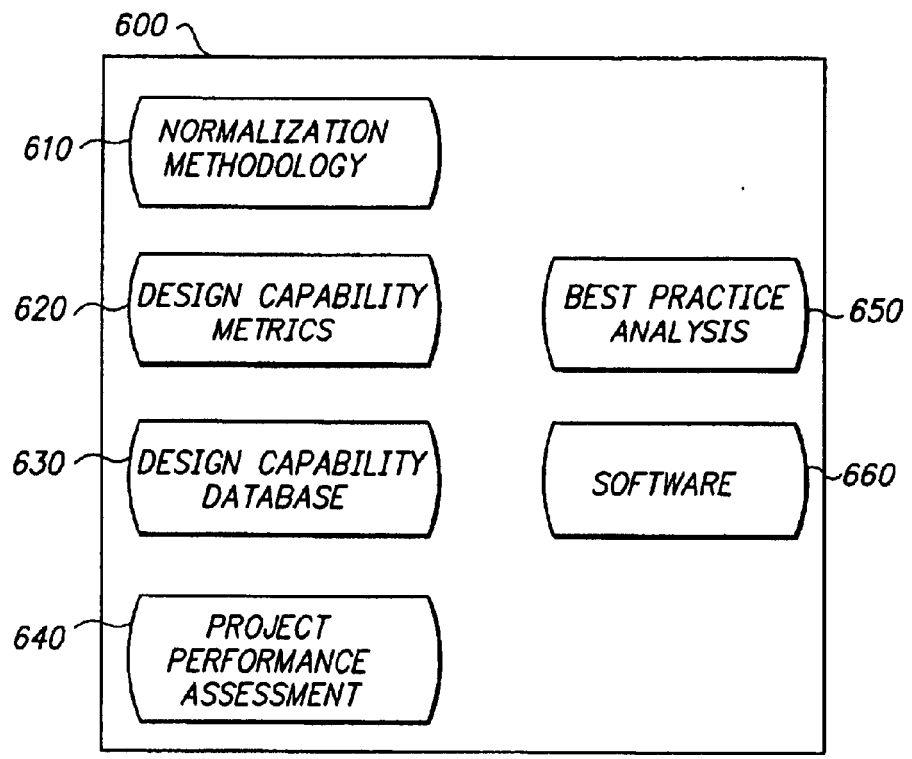
FIG. 6 is a system diagram of the components of the method for measuring circuit design capability, according to a preferred embodiment of the present invention.

FIG. 6 is a system diagram of the components 600 of the method for measuring circuit design capability, according to a preferred embodiment of the present invention. The preferred embodiment of the present invention comprises six interrelated components. However, alternative embodiments can include different numbers and types of interrelated components.

As has been discussed previously, the program comprises one or more software applications 660 that are used to implement any or all of the features of the present invention and to streamline and standardize data collection. The same or different software applications can be used for any steps of the present invention. The program can use any appropriate combination of commercially-available or proprietary software applications to collect, organize, store, analyze, and distribute the data, and to generate any reports. The Normalization Method 610 is used by the program to enable the comparison of heterogeneous designs. In the Normalization Method, the number of normalized transistors is determined according to the equation previously given as Equation 1.

Design Capability Metrics are quantitative measures of a design team's ability to conduct the process of design and produce a finished integrated circuit design that is ready for volume manufacturing. The program uses the Design Capability Metrics 620 to focus and report on design capabilities. In the present invention, normalized transistors are used as the basis for the Design Capability Metrics.

Table 2 lists the Design Capability Metrics according to the preferred embodiment of the present invention. These Design Capability Metrics are focused on the current most critical electronic design issues. The preferred embodiment of the present invention employs four primary metrics to report on design capabilities: time-to-market, design productivity, design reuse, and cost of design. However, alternative embodiments of the present invention can have any number of Design Capability Metrics. The metrics are all "pegged" to normalized transistors to enable standardized interpretation of the measures.

TABLE 2

| METRIC | UNIT OF MEASURE |
|---|---|
| Time to Market | Normalized Transistors per Week |
| Design Productivity | Normalized Transistors per Person-Week |
| Reuse Leverage | Ratio of Design-for-Reuse Costs to Savings |
| Development Cost | Dollars per Normalized Transistor |

The present invention stores design data and performance measurements in a centralized, secure database 630. This data can then be used to produce a Project Performance Assessment 640 and/or a Best Practice Analysis 650.

The Project Performance Assessment ("PPA") 640 is a quantitative evaluation of design capabilities performed on a company-wide or business unit-wide basis. The program executes a PPA by analyzing a relatively small amount of data on a large number of design projects. This data is preferably stored in the database. One suitable software application for processing PPA data is Microsoft Excel and, more particularly, Excel's Visual Basic for Applications programming language.

For example, in one example of the present invention one hundred fifty (150) data values are needed for each project analyzed. In this example, of these 150 data values, one hundred twenty-five (125) describe the sub-circuits (or blocks) in the design and twenty-five (25) data values describe the project in terms of schedule milestones and staffing levels. This data is generally provided by a design manager or project leader, but can also be provided by any engineer(s) working on the circuit design project in question. Each project's performance results are added to the database. The program can then be used to compare design capabilities either internally within a design organization, or externally to other firms by normalizing the design complexity of each circuit project according to the present invention.

A Best Practice Analysis (BPA) 650 is an in-depth project analysis performed on only a few individually selected design projects. The program according to the present invention can be used to perform a BPA to identify either best practices that should be emulated or, conversely, ineffective practices that should be eliminated.

The present invention is operable to provide measurements, analyses, and comparisons in accordance with a selected program goal. An engagement model can then be developed to accomplish the selected program goal. The program can be configured to obtain, store, analyze, and report in accordance with the engagement model. In addition, the different components of the present invention can be implemented as separate modules, in accordance with the requirements of the program goal.

Table 3 lists an exemplary engagement model according to the preferred embodiment of the present invention.

TABLE 3

| PROGRAM GOAL | COMPONENT(S) APPLIED | ADVANTAGES OF PRESENT INVENTION |
| --- | --- | --- |
| Establish Baseline Design Capabilities Measurements | Perform a large number of PPAs on projects representing a cross-section of design projects. | Establishing a quantitative, company-wide baseline measure of design capabilities provides the foundation from which improvement goals can be defined and competitiveness can be evaluated. |
| Identify Design Capability Improvement Opportunities | Perform several BPAs on carefully selected designs. | Suggested best practices can be recommended to engineering and executive management. |
| Define Measurable Design Capability goals | Management team is consulted to establish appropriate numerical targets and a time frame for their achievement. | Design capability goals are generally most effective when used to gauge individual design team performance trends rather than comparing one team against another. [Best accomplished after completing a significant number of PPAs and 1–4 BPAs.] |
| Assess Effectiveness of Improvement Initiatives | Institutionalize PPAs to measure design capability for all/most design projects. | Regular management appraisal regarding attainment of design capability goals is the key to achieving these goals. It is also necessary to periodically reevaluate whether the design capability targets and metrics remain appropriate. |

While the invention is described in conjunction with the preferred embodiments, this description is not intended in any way as a limitation to the scope of the invention. Modifications, changes, and variations which are apparent to those skilled in the art can be made in the arrangement, operation and details of construction of the invention disclosed herein without departing from the spirit and scope of the invention.

Figure 7:
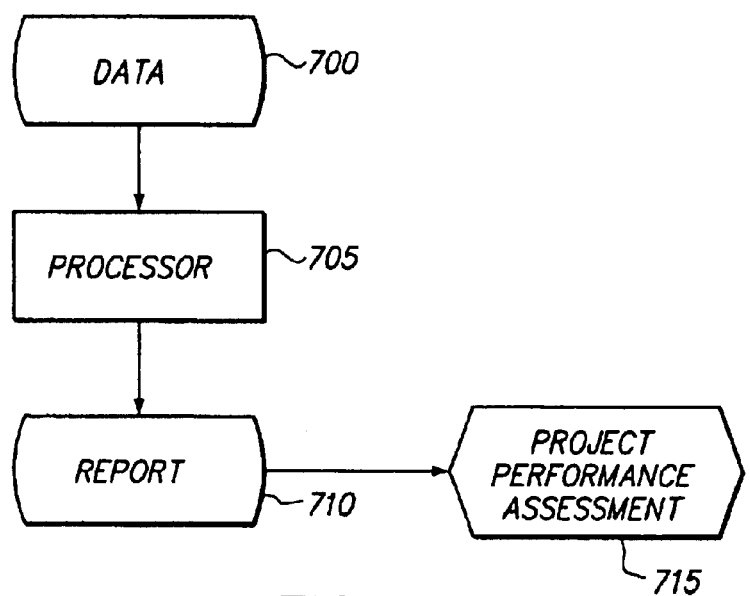
FIG. 7 is a flow chart illustrating the use of the normalization method in implementing design processes according to the present invention.

For example, the present invention can be used to provide both historical and predictive analyses. FIG. 7 is a flow chart illustrating the use of the normalization method in implementing design processes. Data (700) is obtained through any appropriate method such as review of the literature, or surveying, and is stored in a computer-accessible database. This data is then transmitted to a processor (705), such as a computer.

The processor uses the program to apply the Normalization Equation to the data to generate, for example, a report (710) measuring the performance of a design team on a completed project, or a report estimating the amounts of time, effort, and personnel required to accomplish a proposed circuit design project. In addition, the present invention can be used to provide regular reports to monitor a project's progression. Such reports can then be used to implement (715) a company-wide design capability system. Thus, for example, the number of personnel and methods used or to be used to complete a design project can be adjusted in accordance with the results derived according to the present invention. Such changes can be implemented before or during a design project.

The preferred embodiment of the present invention is directed to deriving a single measure of complexity, given the identification of certain complexity factors. With this single measure of complexity used as a measure of design output, productivity can be calculated. In alternative embodiments of the present invention, identified complexity factors and empirical data can be used to estimate effort required for a given project. In addition, these complexity factors and empirical data can be used to identify whether a design project took more or less than an expected amount of effort. In this alternative embodiment of the present invention, it may not be necessary to determine the number of normalized transistors for each circuit design.

What is claimed is:

1. A method for measuring the complexity of a target circuit design, comprising the steps of:
   accumulating a computer-accessible database of historical integrated circuit design project data comprising the total project effort and at least one associated determinant of the complexity of the circuit design for each integrated circuit design project stored in the database;
   identifying from the database, using a computer, at least one measurable determinant of circuit design complexity that is determined to have an effect on the project effort required to design a circuit;
   identifying a parameter of circuit design complexity for a target circuit design;
   normalizing the parameter using the at least one identified determinant of complexity; and
   utilizing the normalized parameter to derive, using a computer, conclusions regarding the time and effort required to implement the target circuit design.

2. The method of claim 1 wherein the parameter of circuit design complexity is the number of transistors in the circuit design.

3. The method of claim 2, wherein the design characteristics are selected from the group consisting of amount of data path circuitry, amount of control logic circuitry, clock frequency, design reuse, transistor layout, power consumption, architectural complexity, asynchronous vs. synchronous clock domain, and number of control bits.

4. The method of claim 2, further comprising the step of mathematically expressing an identified design characteristic as either a composition term or a figure of merit term.

5. The method of claim 4, further comprising the step of using a scaling process to derive a measurable determinant of circuit design complexity reflecting the different levels of relative design complexity within each composition term and the relative magnitude of impact for each figure of merit term.

6. The method of claim 5, wherein the scaling process is selected from the group consisting of estimation and empirical approaches.

7. The method of claim 6 wherein the empirical approach comprises the steps of:
   performing, using a computer, a multiple regression analysis to isolate the impact of each selected design characteristic on required effort;
   analyzing, using a computer, differences in the effort required to design blocks of transistors that vary principally by one design characteristic term;
   isolating, using a computer, the impact of different parameters for use in calculating a coefficient for each selected design characteristic;
   using the coefficient for each selected design characteristic to derive, using a computer, the measurable determinant of circuit design complexity for each composition term; and
   multiplying, using a computer, the total number of transistors by all measurable determinants of circuit design complexity to provide a normalized number of transistors.

8. The method of claim 6 wherein the determination of a value for a composition term measurable determinant of circuit design complexity comprises the step of applying, using a computer, the equation:

$$f_{(reuse)} = (1) \times (\%_{new}) + (a) \times (\%_{reused})$$

where
   $f_{(reuse)}$ is the measurable determinant of circuit design complexity for New/Reused transistors;
   is the value of the coefficient for new transistors;
   $\%_{new}$ is the percentage of new transistors;
   a is the value of the coefficient that shows the relative amount of effort required for reuse in comparison to new circuit design; and
   and $\%_{reused}$ is the percentage of reused transistors.

9. The method of claim 6 wherein the determination of a value for a figure of merit measurable determinant of circuit design complexity comprises the steps of:
   utilizing, using a computer, the standard deviation from the mean to express the relative value of a given design's figure of merit; and
   utilizing, using a computer, an exponential form to dampen the effects of low values of a figure of merit, and to accelerate the effects for high values; wherein any effects the absolute value of a figure of merit might have when used as a multiplicative term in the Normalization Equation are eliminated; and wherein the term is well-behaved for samples at the limits of the distribution.

10. The method of claim 1 wherein the normalizing step comprises the steps of:
   counting, using a computer, the total number of transistors in the target circuit design;
   selecting at least one circuit design characteristic;
   determining, using a computer, the percentages of the total number of transistors having the at least one selected circuit design characteristic;
   determining, using a computer, relative differences in effort required to implement each circuit design characteristic;
   adjusting, using a computer, each selected circuit design characteristic according to its determined relative effort;
   incorporating, using a computer, the adjusted circuit design characteristic into a Normalization Equation; and
   implementing, using a computer, the Normalization Equation to adjust the actual total number of transistors in accordance with the relative differences in effort required to implement each circuit design characteristic.

11. The method of claim 10, wherein the Normalization Equation is:

$$X_{NORM} = X_{TOTAL} \times f_{1(Circuit\ Type)} \times f_{2(Reuse)} \times f_{3(Frequency)} \times f_{4(Density)}$$

where
   $X_{NORM}$ is the number of normalized transistors;
   $X_{TOTAL}$ is the total number of transistors;
   $f_{1(Circuit\ Type)}$ is the measurable determinant of circuit design complexity for circuit type;
   $f_{2(Reuse)}$ is the measurable determinant of circuit design complexity for transistor reuse;
   $f_{3(Frequency)}$ is the measurable determinant of circuit design complexity for clock frequency; and
   $f_{4(Density)}$ is the measurable determinant of circuit design complexity for circuit density.

12. The method of claim 11, further comprising the step of calculating, using a computer, the measurable determinant of circuit design complexity for the circuit type using the formula:

$$f_{1(Circuit\ Type)} = [(t_{CL}) \times (\%_{Control\ Logic})] + [(t_{MEM}) \times (\%_{Memory})] + [(t_{AMS}) \times (\%_{Analog-Mixed\ Signal})] + [(t_{DP}) \times (\%_{Data\ Path})]$$

where
   $f_{1(Circuit\ Type)}$ is the measurable determinant of circuit design complexity for circuit type;
   $t_{CL}$ is the effort coefficient for control logic;
   $t_{MEM}$ is the effort coefficient for memory;
   $t_{AMS}$ is the effort coefficient for analog/mixed signal; and
   $t_{DP}$ is the effort coefficient for datapath.

13. The method of claim 11, further comprising the step of determining, using a computer, the measurable determinant of circuit design complexity for the percentage of reused transistors using the formula:

$$f_{2(Reuse)} = [(1) \times (\%_{New\ Circuitry})] + [(r_L) \times (\%_{Reused\ Logical\ Circuitry})] + [(r_P) \times (\%_{Reused\ Physical\ Circuitry})]$$

where
   $f_{2(Reuse)}$ is the measurable determinant of circuit design complexity for transistor reuse;
   1 is the effort coefficient for new circuitry;
   $r_L$ is the effort coefficient for reused logical circuitry; and
   $r_P$ is the effort coefficient for reused physical circuitry.

14. The method of claim 11, further comprising the step of calculating the measurable determinant of circuit design complexity for the clock frequency using the formula:

$$f_{3\ (Frequency)} = f_3[Frequency(F) \times Gate\ Delay(D)]$$

$$f_{3(Frequency)} = e^{\left(0.23 \times \frac{FxD - \overline{FxD}}{\sigma_{FxD}}\right)}$$

where $f_{3\ (Frequency)}$ is the measurable determinant of circuit design complexity for clock frequency;

F×D is the value of the figure of merit calculated for the specific design being evaluated;

$\overline{F{\times}D}$ is the average figure of merit for the database; and $\sigma_{F{\times}D}$ is the standard deviation of the distribution of data points.

15. The method of claim 11, further comprising the step of calculating, using a computer, the density measurable determinant of circuit design complexity using the formula:

$$f_{4\ (Density)} = f_4(Density{\times}Pitch^2/Layers)$$

$$Z = (Density{\times}Pitch^2/Layers)$$

$$f_{4(Density)} = e^{\left(0.23{\times}\frac{Z-\overline{Z}}{\sigma Z}\right)}$$

where $f_{4\ (Density)}$ is the measurable determinant of circuit design complexity for density;

Z is the figure of merit for the design being evaluated;

$\overline{Z}$ is the average figure of merit for the database; and $\sigma_Z$ is the standard deviation of the distribution of data points.

16. The method of claim 1, further comprising the step of applying, using a computer, at least one test of significance to the stored data, using standard statistical analysis.

17. The method of claim 1, further comprising the step of using the derived conclusions to develop an engagement model to accomplish a program goal for the target circuit design project.

18. The method of claim 17, wherein the program goal is selected from the group consisting of establishing baseline design capabilities measurements, implementing procedural changes to improve design project efficiency, assessing effectiveness of improvement initiatives, defining measurable design capability goals, allocating personnel or funding to a target circuit design project, and preparing a bid for a circuit design project.

19. The method of claim 1, further comprising the step of utilizing, using a computer, identified measurable determinants of circuit design complexity and empirical data to compare the effort required for a target circuit design project to an expected amount of effort.

20. A computer-implemented method of deriving conclusions regarding the time and effort required to implement a target circuit design, comprising the steps of accumulating a database of historical integrated circuit design project data;

identifying from the database at least one complexity factor that affects circuit design project effort;

counting the total number of transistors in the target circuit design;

selecting at least one circuit design characteristic;

determining the percentages of the total number of transistors having the at least one selected circuit design characteristic;

determining relative differences in effort required to implement each circuit design characteristic;

adjusting each selected circuit design characteristic according to its determined relative effort;

normalizing the number of transistors using the at least one identified complexity factor for the target circuit design;

incorporating the adjusted circuit design characteristic into a Normalization Equation; and implementing the Normalization Equation to adjust the total number of transistors in accordance with the relative differences in effort required to implement each circuit design characteristic to derive the normalized number of transistors; and utilizing the normalized number of transistors to develop an engagement model to accomplish a program goal for the target circuit design project.

21. The method of claim 20, wherein the complexity factors comprise circuit type, transistor reuse, clock frequency, and circuit density.

22. A method of using a computer to measure circuit design capability, comprising the steps of:

selecting a circuit design parameter, namely, the number of transistors in the circuit design;

identifying at least one complexity factor for the circuit design;

determining the value of the at least one complexity factor; and using the value of the at least one complexity factor to determine a normalized value of the circuit design parameter;

wherein the step of determining the value of the at least one complexity factor further comprises the steps of:

determining whether the at least one complexity factor is a composition term or a figure of merit term;

deriving the value of the composition term by defining at least one design characteristic of the at least one complexity factor, determining the percentages of the complexity factor that are attributed to each defined design characteristic, multiplying the percentage of each defined design characteristic by a respective effort coefficient, and summing the multiplied percentages of each defined design characteristic of the at least one complexity factor;

deriving the value of each figure of merit term by eliminating any effects the absolute value of the figure of merit might have when used as a multiplicative term, insuring that the figure of merit term is well-behaved for samples at the limits of the distribution, and scaling the impact that complexity factors included in the figure of merit term have upon a required target circuit design project effort; and multiplying the total number of transistors in the circuit design by the values of each composition term and each figure of merit term.

23. The method of claim 22, wherein the step of multiplying the percentage of each defined design characteristic by a respective effort coefficient further comprises the steps of:

determining the effort required to implement the at least one defined design characteristic of a identified complexity factor;

selecting a reference design characteristic of the identified complexity factor;

setting the coefficient of the reference design characteristic to one; and representing the value of a coefficient of an identified design characteristic as a ratio of the effort required to implement the at least one identified design characteristic as compared to the selected reference design characteristic.

24. The method of claim 22, wherein the step of deriving the value of each figure of merit term further comprises the steps of:

calculating the standard residual of the figure of merit;

using an exponential form to dampen the effects of low values of the figure of merit and accelerate the effects of high values; and multiplying a scaling coefficient by the standard residual of the exponent.

25. A system for measuring circuit design complexity, comprising:

means for accumulating a computer-accessible database of historical integrated circuit design project data;

means for identifying from the database, using a computer, at least one complexity factor that significantly affects circuit design project effort;

means for determining the total number of transistors for a target circuit design; and means for using the at least one identified complexity factor to normalize the total number of transistors for the target circuit design;

means for determining the percentage of the total number of transistors having at least one selected circuit design characteristic;

means for determining relative differences in effort required to implement the at least one selected circuit design characteristic;

means for adjusting the at least one selected circuit design characteristic according to its determined relative effort;

means for incorporating the adjusted at least one circuit design characteristic into a Normalization Equation; and means for implementing the Normalization Equation to adjust the total number of transistors in accordance with the relative differences in effort required to implement the at least one circuit design characteristic.

* * * * *